(12) United States Patent
Tebbit et al.

(10) Patent No.: US 7,725,106 B2
(45) Date of Patent: May 25, 2010

(54) METHODS, DEVICES AND SYSTEMS RELATING TO RESELECTING CELLS IN A CELLULAR WIRELESS COMMUNICATIONS SYSTEM

(75) Inventors: Nicholas John Tebbit, Old Windsor Berkshire (GB); Amit Agarwal, San Diego, CA (US); Mohit Narang, Escondido, CA (US); Vishal V. Varma, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 11/340,893

(22) Filed: Jan. 26, 2006

(65) Prior Publication Data

US 2007/0173254 A1    Jul. 26, 2007

(51) Int. Cl.
*H04W 36/00* (2009.01)
(52) U.S. Cl. .................. 455/436; 455/439; 455/442
(58) Field of Classification Search .......... 455/436, 455/439, 442
See application file for complete search history.

(56) References Cited

U.S. PATENT DOCUMENTS

| 6,052,598 | A | 4/2000 | Rudrapatna et al. |
| 6,978,137 | B2 | 11/2002 | Gwon et al. |
| 7,260,405 | B2 | 8/2007 | Kim et al. |
| 2004/0219918 | A1 | 11/2004 | Kakishima et al. |

FOREIGN PATENT DOCUMENTS

| GB | 2284321 | A | * | 5/1995 |
| GB | 2287858 | A | * | 9/1995 |
| WO | 99059253 | | | 11/1999 |
| WO | 0207459 | A2 | | 1/2002 |
| WO | 04073322 | | | 8/2004 |

OTHER PUBLICATIONS

Digital cellular telecommunications system(phase 2+); ETSI TS 145 008; Radio subsystem link control (Release 6), 3GPP TS 45.008 V6.15.0, 2005-11,version 6.15.0, 3GPP, pp. 1-115.
3rd Generation Partnership Project; Technical Specification Group GSM/Edge Radio Access Network; Radio subsystem link control (Release 4), 3GPP TS 45.008 V4.16.0, 2004-11, section 6.6.2, 3GPP, Valbonne - France.
Digital cellular telecommunications system (phase 2+); ETSI TS 145 008; Radio subsystem link control (Release 6), 3GPP TS 45.008 V6.15.0, Nov. 2005, version 6.15.0, 3GPP, pp. 1-115. XP014032951.

* cited by examiner

*Primary Examiner*—Nick Corsaro
*Assistant Examiner*—Shannon R Brooks
(74) *Attorney, Agent, or Firm*—Kristine U. Ekwueme

(57) ABSTRACT

Cell reselection comprises monitoring a first indicator indicative of a signaling level of the serving cell, and monitoring second indicators, each indicative of a signaling level of one of plural potential target cells. A timer associated with a potential target cell is initiated when the respective second indicator indicates that the signaling level of the potential target cell is better than the signaling level of the serving cell. Each timer has an associated expiry, and, if at least one timer has been initiated by the expiry of another initiated timer, then, after delaying for an additional period after at least the first timer has expired, a target cell is selected from the potential target cells. The target cell is selected that has a second indicator which indicates that the signaling level of the respective target cell is better than the signaling level of the serving cell.

21 Claims, 5 Drawing Sheets

METHODS, DEVICES AND SYSTEMS RELATING TO RESELECTING CELLS IN A CELLULAR WIRELESS COMMUNICATIONS SYSTEM

BACKGROUND

1. Field

The present invention relates to methods, devices and systems for reselecting and then handing over a mobile communications device from a first cell to a second cell in a cellular wireless communication system. More particularly, although not exclusively, aspects and embodiments of the invention relate to criteria for selecting a second cell while a mobile station is 'camped' on, or otherwise interacting with and/or controlled by, a first cell. Particular aspects and embodiments of the present invention are well suited for use in a cellular wireless communications system which supports packet switched communications, for example according to the General Packet Radio Service (GPRS) standard, but are not limited to such an application.

2. Background

It is well known that cellular wireless communication systems generally comprise a number (often large) of radio transceivers, or base stations, that define service areas or cells. The schematic diagram in FIG. 1 of the accompanying drawings, illustrates a system 100 comprising four base stations 120 defining respective cells 110. The cells typically overlap in order to ensure continuous coverage of service in the service areas. This is desirable for many reasons, not least because cellular systems are designed specifically to accommodate users as they move around within the system. In principle, mobile communications devices 130 interact with various base stations as the devices move through the respective cells 110 of the system 100.

One of the goals of a cellular wireless communication system is to enable a mobile communications device, which will be referred to herein for convenience as a "mobile station", to remain connected to the system even when the user is moving through the system from one cell to another. Traditionally, the mobile station has been a so-called "mobile phone" or "cellular phone," although, with advances in technology, a mobile station may be any one or more of a wide range of devices from solely voice devices to solely data devices. A mobile station may be anything from a traditional radio pager or mobile phone, though faxes, personal data assistants (PDAs), and music players, to computers, or any combination of these. This list is, of course, far from exhaustive. Indeed, although the term "mobile station" is used herein, the term is also intended to encompass devices that may not be user-operated or even user-operable, for example the device could be a wireless 'data card' or the like, which is within another kind of apparatus.

Early cellular systems were circuit switched systems. That it to say, for each call the system created a circuit that reserves a channel for the user for the duration of the call. This is an inefficient use of resources, especially for bursty data. As technology has advanced, newer cellular systems have moved away from circuit switching to packet switching in which bursts of data are sent only when needed. Consequently, cellular systems have become more suitable for the transmission of data, which tends to be transmitted in bursts rather than a continuous stream.

As already mentioned each cell in a cellular system is defined and served by a base station. As a mobile station is moved from the service area defined by one cell into that defined by another, the system and the mobile station must break the connection with one base station and establish a connection with another base station whilst minimizing the connection loss between the mobile station and the system. This operation is sometimes known as a cell reselection, a handoff or a handover. For simplicity of description only herein, the term "reselection" will be used as a generic term to describe the operations involved with a mobile station or equivalent moving from operating with one base station to operating with another base station; and the reader should import an alternative term, such as "handover", "handoff" or the like, if the context so dictates. The term "camped on" is commonly used, and will be used hereinafter, to describe the base station with which, and respective cell in which, a mobile station is operating. That is, a cell reselection involves a mobile station moving from being camped on one cell to being camped on another cell.

Typically, a cell reselection can be initiated either by the mobile station or by the cellular system. How reselection is initiated can depend on factors such as the kind of cellular system, its mode of operation and on the capabilities of a mobile station. In any event, reselection is typically initiated either as a result of a service degradation, which tends to lead to increased power consumption requirements, or there being an opportunity to improve the service, which would lead to reduced power consumption requirements. Especially since many mobile stations operate from battery power, an opportunity to reduce power consumption, thereby improving power efficiency, is usually advantageous. Service degradation can result from factors such as increasing distance between a mobile station and a base station or natural or man-made obstructions such as hills or buildings respectively.

One known kind of reselection operation requires a mobile station to monitor the signaling level and suitability of cells that neighbor the cell on which the mobile station is camped, which will be referred to hereinafter as the "serving cell", and compare the monitored service levels with the signaling level and suitability of the serving cell.

Then, if the signaling level and suitability of a neighboring cell is deemed by the mobile station to be better than that of the serving cell, for at least a predefined period of time (say, five seconds), the mobile station initiates a reselection to the respective neighboring cell, which becomes the new serving cell. Such an operation is described in an ETSI Technical Specification document 145 008 v4.16.0, Digital Cellular telecommunications system (phase 2+); Radio subsystem link control (3GPP TS 45.008, version 4.16.0, release 4, section 6.6.2).

SUMMARY

The present inventors have appreciated that, according to the prior art, unnecessary cell reselection operations can occur. Since cell reselection operations can consume a significant amount of power and/or result in a significant break in communications during an established voice call or other connection, the present inventors have appreciated that it would be advantageous to attempt to avoid unnecessary cell reselection operations. Aspects and embodiments of the invention are, therefore, aimed at avoiding unnecessary cell reselection operations.

According to one aspect of the present invention there is provided a cell reselection method for handing a mobile station from a serving cell to a selected target cell in a cellular wireless communications system, comprising plural cells, including the serving cell and plural other cells that are potential target cells, the method comprising: monitoring a first indicator, which is indicative of a signaling level of the serving cell; monitoring second indicators, each one being indicative of a signaling level of one of the plural potential target cells;

initiating a timer associated with a potential target cell, when the respective second indicator indicates that the signaling level of the potential target cell is better than the signaling level of the serving cell, each timer having an associated expiry;

if at least one timer has been initiated by the expiry of another initiated timer, then, after delaying for an additional period after at least the first timer has expired, selecting from the potential target cells a target cell having a second indicator, which indicates that the signaling level of the respective target cell is better than the signaling level of the serving cell; and initiating a cell reselection of the mobile station to the selected target cell.

According to another aspect of the present invention there is provided a cellular wireless communications system comprising plural cells, including a serving cell and plural potential target cells, and a mobile station operable with the cellular wireless communications system, the system comprising:

a first process, arranged to monitor a first indicator, indicative of a signaling level of the serving cell;

a second process, arranged to monitor second indicators, each one being indicative of a signaling level of one of the plural potential target cells;

a third process, arranged to compare the first indicator with the second indicators and initiate a timer associated with a potential target cell whenever the respective second indicator of the potential target cell is better than the first indicator, each timer having an associated expiry; and a fourth process, arranged to select from the potential target cells, if at least one timer has been initiated by the expiry of another initiated timer and after delaying for an additional period after at least the first timer has expired, a target cell having a second signaling indicator, which indicates that the signaling level of the respective target cell is better than the signaling level of the serving cell, and initiate cell reselection to the selected target cell.

According to yet another aspect of the present invention there is provided a mobile station adapted for operation in a cellular wireless communications system, the device comprising:

a receiver arranged to receive signals and derive indicators therefrom, each indicator being indicative of the signaling level of a cell of the system; and a processor arranged to operate a cell reselection operation, the operation comprising:

a first process, arranged to monitor a first indicator, indicative of a signaling level of the serving cell;

a second process, arranged to monitor second indicators, each one being indicative of a signaling level of one of the plural potential target cells;

a third process, arranged to compare the first indicator with the second indicators and initiate a timer associated with a potential target cell whenever the respective second indicator of the potential target cell is better than the first indicator, each timer having an associated expiry; and a fourth process, arranged to select from the potential target cells, if at least one timer has been initiated by the expiry of another initiated timer and after delaying for an additional period after at least the first timer has expired, a target cell having a second signaling indicator, which indicates that the signaling level of the respective target cell is better than the signaling level of the serving cell, and initiate cell reselection to the selected target cell.

The invention also provides a communication device in which characteristics of signals of different sources are monitored over respective time periods and a source is selected for communication when the monitored characteristic has satisfied certain criteria over substantially all of its respective time period.

The invention extends to a radio communication unit in which signals of different cells are monitored in time periods and a cell is selected for communication when the monitored signal thereof has satisfied certain criteria by the end of its respective time period.

The invention also extends to a transceiver in which signals of different communications nodes in a communications network are observed during associated intervals to determine a signal behavior which is used identify at least one node suitable for subsequent communication with the transceiver.

The above and further features of the invention are set forth with particularity in the appended claims and together with advantages thereof will become clearer from consideration of the following detailed description of an embodiment of the invention given by way of example with reference to the accompanying drawings.

DETAILED DESCRIPTION

Figure 1:
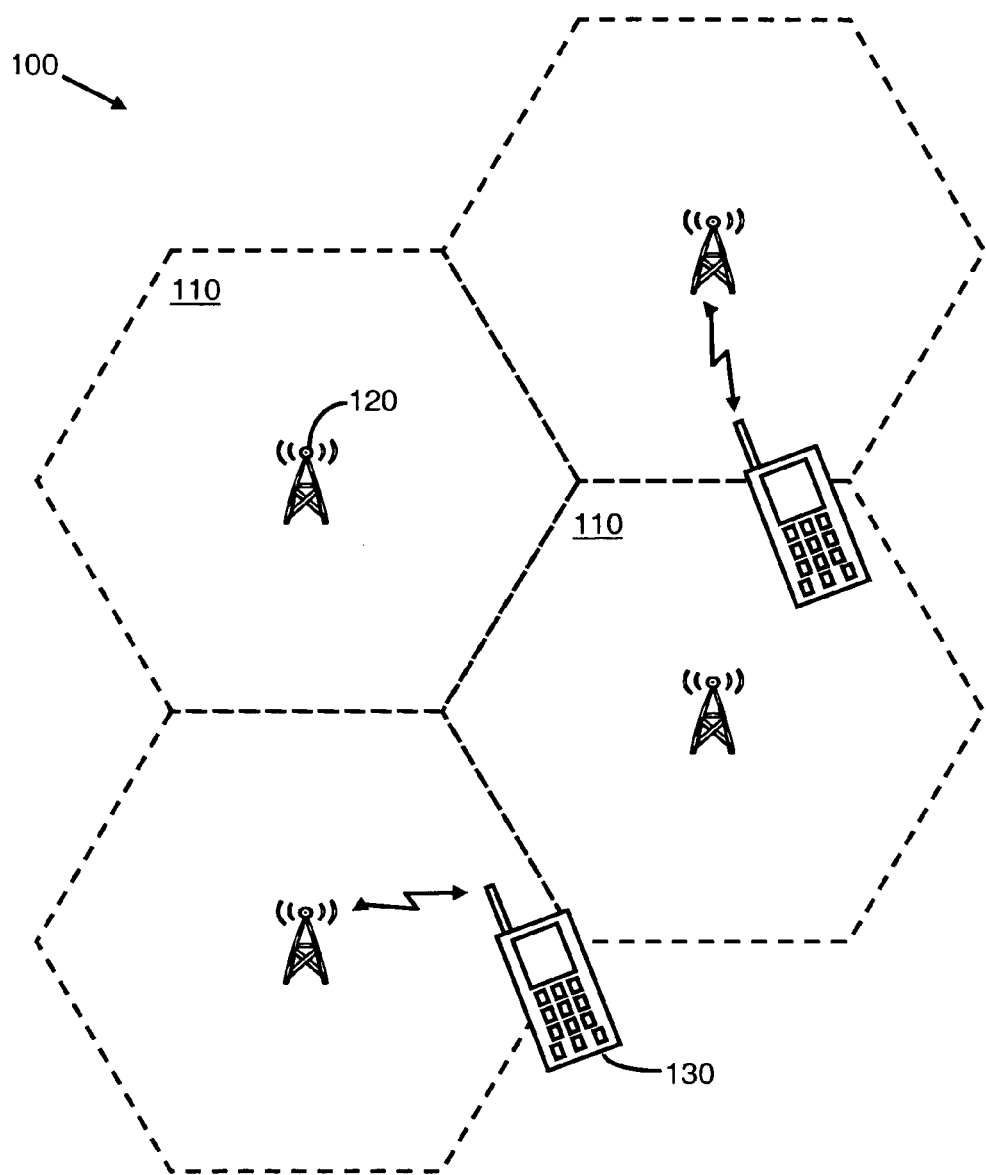
FIG. 1 is a schematic diagram showing a cellular wireless communications system.
Figure 2:
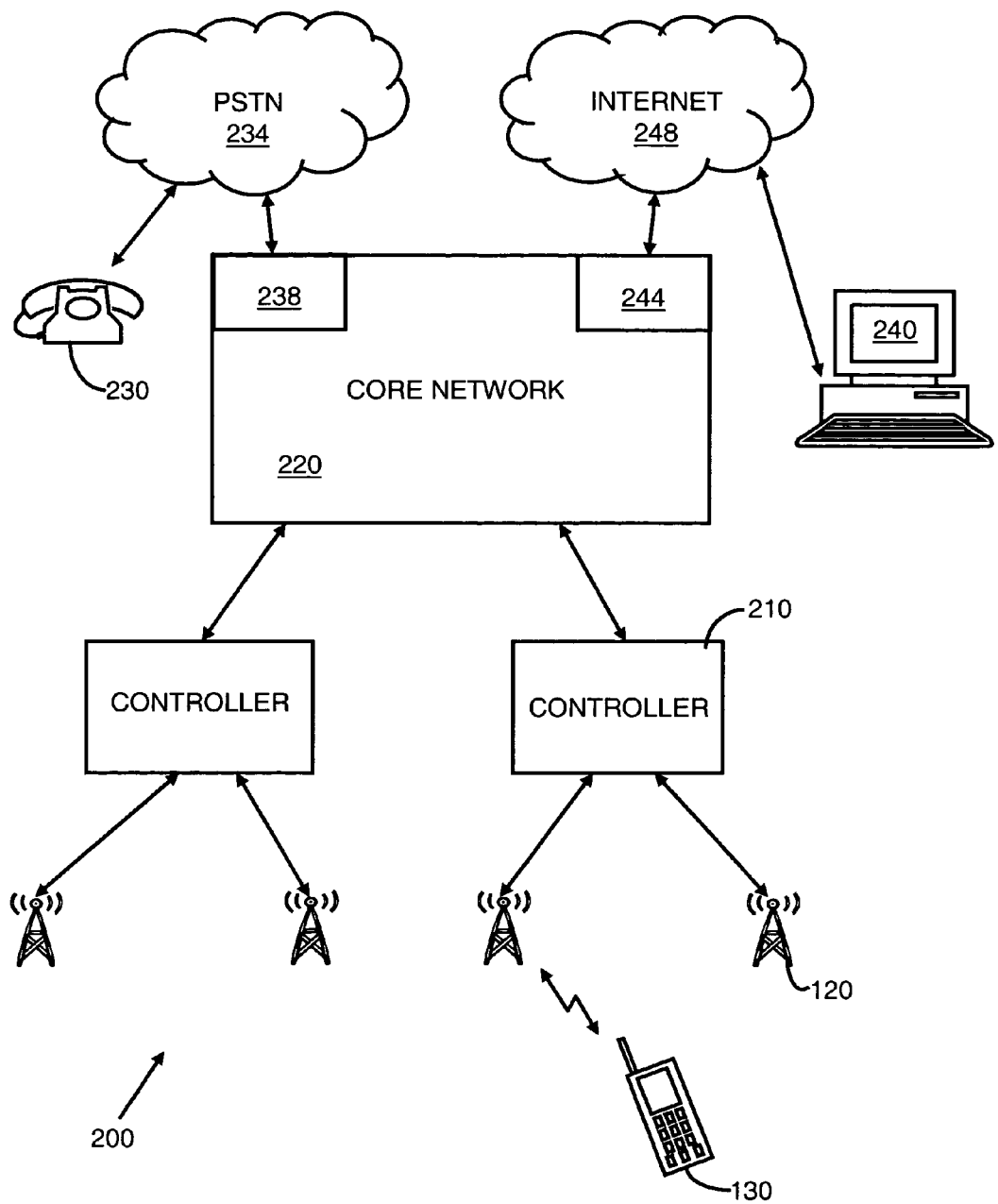
FIG. 2 is a high level block diagram showing the main components in a cellular wireless communications system.

Turning now to the schematic diagram in FIG. 2 of the accompanying drawings, there is shown a high level block diagram of a typical wireless cellular communications system, for example as shown in FIG. 1. For the purposes of illustration, the system includes only four base stations 120, which provide access to the system for mobile stations 130, for example mobile telephone handsets. Each base station 120 is controlled by a controller 210 and each controller 210 is connected to a core network 220 of the system, via an appropriate communications infrastructure. Each controller 210 can control one base station 120 but typically a controller controls more than one base station. The core network 220 in general contains the infrastructure, components and functionality for controlling the controllers 210; routing calls and connections of all kinds from and to mobile stations 130; routing calls and connections from mobile stations 130 to other systems and terminating equipment; and receiving calls and connections, from other systems and terminating equipment, which are intended for mobile stations. Examples of other terminating equipment are traditional telephone equipment 230, which are connected to via a PSTN 234 and PSTN gateway 238 of the core network 220, Internet servers 240, which are connected to via an Internet gateway 244 and the Internet 248, and other telecommunications systems or services (not shown), such as voicemail or corporate networks respectively.

There are various kinds of wireless cellular communications systems, which operate according to various different standards. Such systems and standards include, but are not limited to, GSM, GPRS and third generation standards such as UMTS and WCDMA. The diagram in FIG. 2 is intended to be generic, and apply, at least functionally, to all such standards and systems.

Particular embodiments of the present invention relate to cell reselection in a GPRS system. According to the GPRS terminology, a base station 120 is commonly referred to as a base transceiver station (BTS) and the controller 210 is commonly referred to as a base station controller (BSC). The combination of BTS and BSC is commonly referred to as the base station subsystem (BSS). Hereafter, while GPRS components will be referred in order to describe particular embodiments of the present invention, it will be appreciated that the principles taught apply equally to other kinds of wireless cellular communications systems, such as GSM and 3G.

Figure 3:
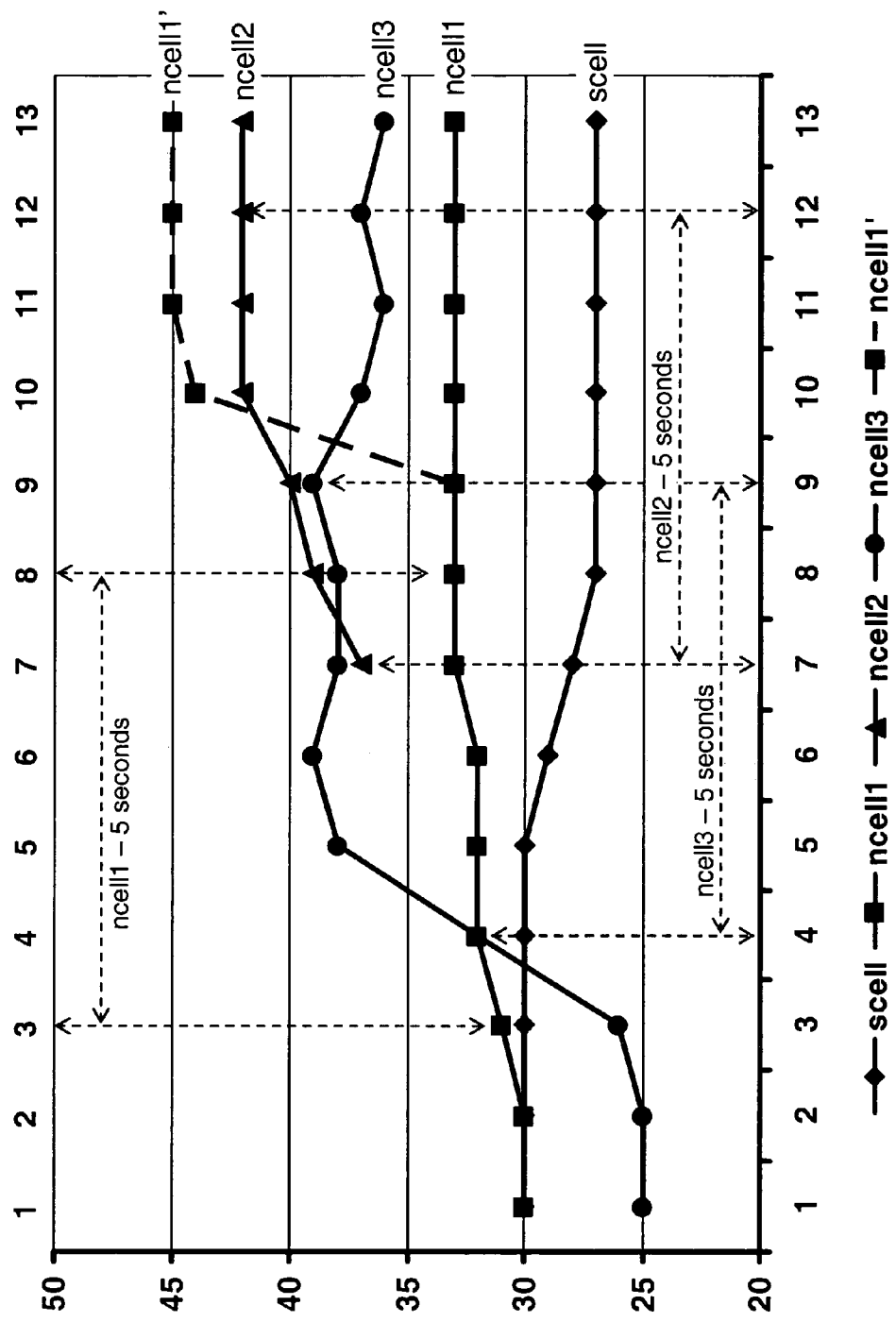
FIG. 3 is a graph showing a comparison of signaling parameter C2 levels for a serving cell and neighbor cells.

Turning now to FIG. 3, the graph therein shows four trend lines, which illustrate exemplary signaling relationships between a mobile station, its serving cell (scell), on which the mobile station is camped, and three neighboring cells (ncell1-ncell3). The signaling relationships are characterized by a signaling parameter, C2, the value of which provides an indication of the strength of signals received by the mobile station from the respective cells. In general, a higher value of C2 indicates a stronger signal between the mobile station and the cell.

It will be evident that alternative embodiments of the present invention may rely on deriving and/or monitoring different indicators, parameters and characteristics of systems and mobile stations, insofar as the parameters and characteristics relate in some way to the likely signaling performance or capability between the mobile station and a base station or similar.

In known GPRS systems, a mobile station monitors the C2 values of all cells that are classed as neighbors of the serving cell. Each cell identifies which other cells are classed neighbors and a list of neighbors is communicated to a mobile station, by a new serving cell, during or soon after a cell reselection operation. The mobile station attempts to monitor the C2 values for the serving cell and all neighbor cells during the time the device is camped on the serving cell. A mobile station generates C2 values in a pre-defined way, for example as described in section 6.4 of the aforementioned ETSI document, by evaluating various characteristics of signals received from the neighbor cells; although the most important characteristic is typically signal power. Typically, a mobile station will scan for neighbor cell signals periodically, for example every second, or as otherwise defined by a control program of the mobile station, in order to monitor the C2 levels.

Referring to the trend lines in the graph in FIG. 3, it is shown that the C2 value of scell decreases over time, from a value of 30 to a value of about 27. After two seconds, the C2 value for ncell1 becomes higher than the C2 value of scell, and remains higher for the remainder of the period shown. This may be as a result of the mobile station moving away from the scell BTS and towards the ncell1 BTS. In principle, it would appear to make sense for the mobile station to select ncell1 as a new serving cell in order to improve power-efficiency. In practice, this is exactly what happens according to prior art reselection operations. Specifically, according to the prior art, as soon as the mobile station detects that the C2 value of ncell1 is higher than the C2 value of scell (which, according to the graph, is when three seconds have lapsed), the mobile station starts a timer running. Then, if, after the timer expires (for example after another five seconds), the situation remains the same, at around eight seconds, a reselection to ncell1 is initiated by the mobile station.

According to the graph in FIG. 3, by four seconds, the C2 value for ncell3 rapidly becomes higher than the C2 value of scell. Indeed, after four seconds, the C2 value of ncell3 also exceeds the C2 value of ncell1, and remains higher for the remaining period shown. Such a dramatic increase in the C2 power of ncell3 may result from, for example, the mobile station moving out from behind an obstruction that was inhibiting receipt of transmissions from the BTS of ncell3. Furthermore, at around seven seconds, the C2 value of ncell2 suddenly increases. The suddenness of the increase may be because, up until seven seconds, attempts to scan signals from that neighbor cell had failed. Similarly, the sudden increase may be due to the mobile station moving out from behind an obstruction that was blocking receipt of transmissions from the BTS of ncell2.

According to the graph in FIG. 3, applying a known reselection operation, reselection from scell to ncell1 is initiated after eight seconds, even though, at that point in time, the C2 level of both ncell2 and ncell3 exceeds the C2 level of ncell1. The result is that, as soon as cell reselection is complete, and the mobile station begins to monitor C2 levels of its new neighboring cells (assuming at least one of ncell2 and ncell3 is a neighboring cell of ncell1), another timer is triggered almost immediately with a view five seconds later to initiating another reselection operation to one of ncell2 or ncell3.

A cell reselection operation, by its nature, can cause a significant disruption to communications. This is at least in part because, according to the GPRS standard, as soon as a mobile station reselects to a new cell, the mobile station can spend as long as eight seconds reading broadcast information before camping onto the new cell.

The present inventors have appreciated that it can be inefficient to initiate cell reselection to the first neighbor cell that appears to have an improved C2 value. The graph in FIG. 3 illustrates this very well, wherein, according to the known reselection operation, the mobile station reselects to a cell, ncell1, which does not have the best C2 value at the time of reselection.

An embodiment of the present invention will now be described in detail, wherein, in a GPRS system, a cell reselection operation is held off, in other words delayed, until it is evident that reselection will be to the most appropriate neighbor cell. It will, however, be appreciated that the principles are equally applicable in GPRS systems and in other kinds of wireless cellular communications systems, wherein the reselection may be initiated by the BSS (or equivalent), the core network or by a mobile station.

Figure 4:
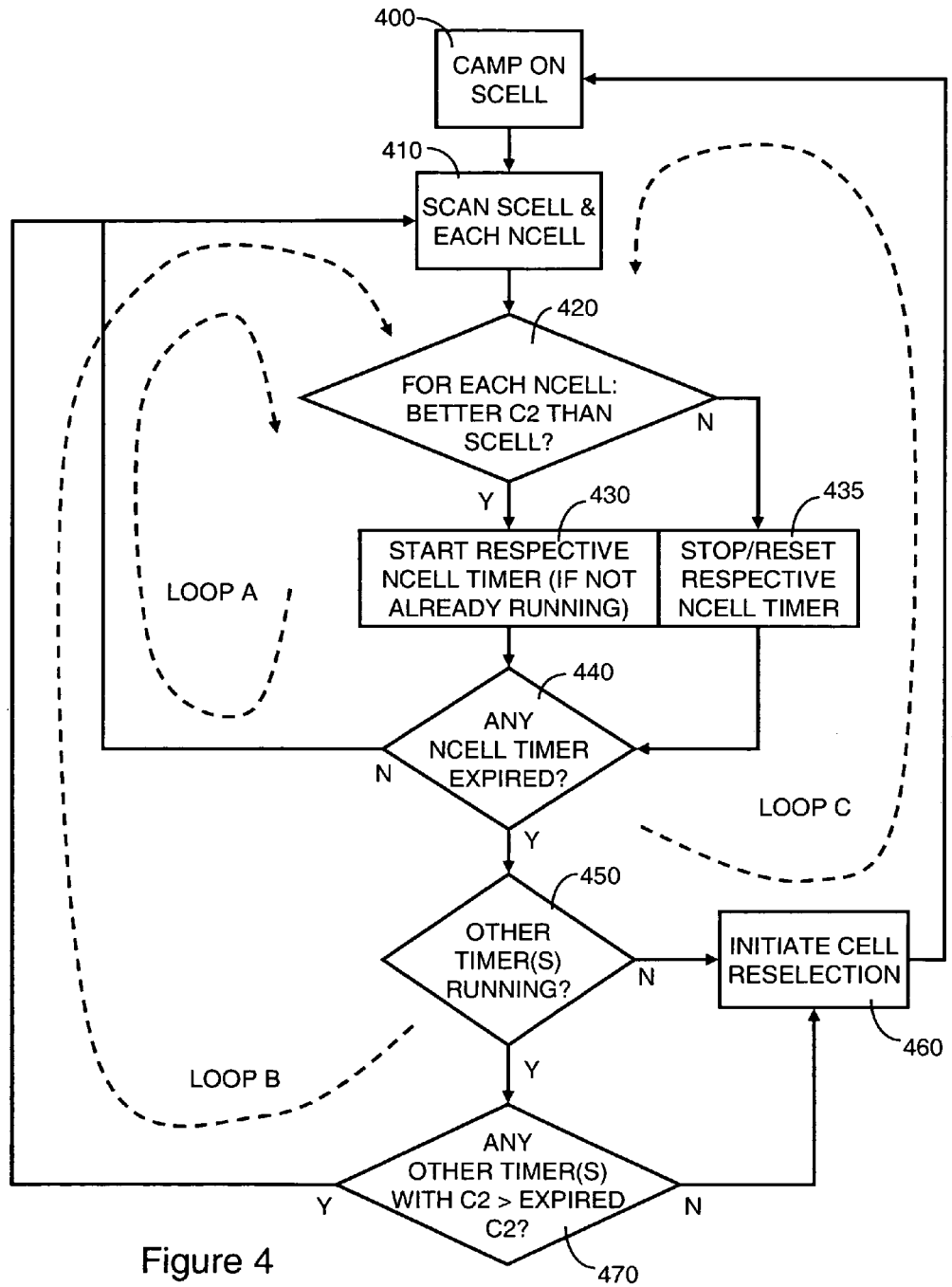
FIG. 4 is a flow chart illustrating a cell reselection operation according to one embodiment of the present invention.

Referring now to the flow diagram in FIG. 4, in a first step 400, a mobile station becomes camped on a new serving cell-(scell) and acquires its necessary upstream signaling information and neighbor cell information from the respective BTS, in a known way. In a next step 410, the mobile station scans for signals from the serving cell and the respective neighboring cells and derives the respective C2 values.

In a next step 420, the mobile station determines whether a C2 value of any neighboring cell is better than the C2 value of the serving cell. If the result of the determination is positive for any neighboring cell (that is, the neighboring cell has a higher C2 value than the serving cell), then, in a next step 430, the mobile station starts a timer, which the mobile station associates with the respective neighbor cell. If a respective timer is already running then no additional action occurs and the timer is left running. If, on the other hand, the result of the determination is negative for any particular neighboring cell (that is, the neighboring cell has a lower C2 value than the serving cell), then, in a step 435, any respective running timer is stopped and reset. If no timer is running, then no action occurs.

In other words, according to the present exemplary embodiment, for each scan operation, a timer is started (or permitted to continue) for any neighboring cell which has a better C2 value than the source cell. A timer runs until a pre-determined expiry time, unless, before or on expiry, the C2 value drops below the C2 value of the source cell, in which case the timer is stopped and reset (or otherwise cancelled). Obviously, in the example provided, a timer is not started for a neighboring cell unless its C2 becomes better than the C2 value of the source cell.

Next, in a step 440, the mobile station determines whether any timer has expired. In this example, the timers are set to expire after five seconds. In other examples, a different expiry time may be selected. In the step 440, if no timer has expired, then the process returns to the step 410, whereat the mobile station again scans for signals from the source cell and neighbor cells, and the process repeats.

If, however, in the step 440, the mobile station establishes that a timer has expired, the mobile station enacts a further check, in a step 450, to determine whether any other timers are running. If no other timers are running then, according to this embodiment, the mobile station initiates a cell reselection operation, in a step 460, to the neighboring cell, to which the expired timer belongs. If two or more timers expire at the same time then the cell reselection operation reselects to the neighboring cell that has the best C2 value. The process then repeats from the step 400.

If, in the step 450, the mobile station determines that at least one other timer is running, the process enacts a final check, in a step 470, to establish if the C2 level of the (or at least one) cell, for which a timer is running, is better than the C2 level of the cell (or cells, if more than one has expired) associated with an expired timer. If the result of the check in step 470 is negative (that is, of the timers still running none is associated with a neighboring cell that has a better C2 value than the or each timer that has expired), then the process jumps to step 460, where a cell reselection operation takes place, to reselect to the neighbor cell that has expired and has the highest C2 value.

If the result of the check in step 470 is positive (that is, of the timer(s) running, at least one is associated with a neighboring cell that has a better C2 value than each neighboring cell for which a timer has expired) the process jumps back to the step 410, whereat the mobile station holds-off reselection, scans for signals from the source cell and the neighboring cells, and the process repeats.

In other words, according to the present exemplary embodiment, for each scan operation, cell reselection is held-off (or otherwise delayed) as long as at least one timer is running and the C2 value of the neighboring cell, which is associated with that timer, is better than the C2 value of neighboring cells for which an associated timer has already expired.

The cell reselection operation will now be tested against the C2 level information shown in the graph in FIG. 3. As can be seen in the flow diagram in FIG. 4, the reselection operation has three main decision loops, identified as A, B and C. It is evident that, up until eight seconds on the graph in FIG. 3, before any timer expires, the operation executes only the process steps in loop A, due to the test in step 440. While iterating around loop A, as a result of the test in the step 420 returning a positive result, three timers are started; at three seconds (for ncell1), four seconds (for ncell3) and seven seconds (for ncell2). At eight seconds, however, the first timer (for ncell1) expires and the test in step 440 becomes positive. Since, two other timers (for ncell3 and ncell2) are still running at eight seconds, and both have a better C2 value than the cell (ncell1) for which the timer has expired, the process enters loop B, due to the positive result of the test in the step 450 (which indicates that other timers are still running) and the positive result in step 470, which indicates that at least one cell for which a timer is still running has a better C2 value than the cell (or cells) for which the timer has (or timers have) expired.

In contrast, in the prior art reselection operation, loop B does not exist, since reselection occurs as soon as a first timer expires. From the point where a first timer expires, the process remains in loop B.

According to the graph in FIG. 3, the first occasion when a timer expires (for ncell2), and no other timer is running (which is associated with a neighboring cell which has a better C2 value), is at 12 seconds, whereat the process enters loop C, as a result of the negative result of the test in the step 450, and reselection to the cell having the last timer to expire and the best C2 level (that is, ncell2) is initiated in step 460.

In the foregoing exemplary embodiment, it is clear that the last timer to start is associated with ncell2. It is also clear that, at twelve seconds, ncell2 also has the best C2 level. Consequently, the operation reselects to ncell2. This process avoids at least one unnecessary cell reselection operation.

In other instances, according to exemplary embodiments of the present invention, the last timer to start before reselection occurs might not be associated with the neighbor cell that has the best C2 value when the last timer expires. For example, referring again to the graph in FIG. 3, assume that the C2 level of an alternative ncell1 increases rapidly for some reason at around nine seconds, and exceeds the C2 value of ncell2 at around ten seconds, as illustrated by the broken ncell1' trend line in the graph. In this alternative example, since the ncell1 value was already higher than the scell C2 value at nine seconds, no new timer would have been started. Indeed, the ncell1 timer had previously started and then expired by eight seconds. According to this example, as a result of a negative test result in step 470 of the process, a reselection to alternative ncell1 would take place at around ten seconds, even though the timer associated with ncell2 would not otherwise expire for another two seconds. A similar, advanced reselection would occur in the event that the C2 value of any cell for which a timer had expired increased above the C2 level of all cells having running timers.

In the first of the foregoing examples, cell reselection is held off for a further four seconds—from eight seconds to 12 seconds—after the first timer expires. As a result, a needless reselection from ncell1 to ncell2 is avoided. In the second example, in fact, a reselection to the alternative ncell1, ncell1', is merely delayed from eight seconds to ten seconds, which is not a significant delay in practical terms. It is anticipated that, on the whole, circumstances similar to those of the first example would occur far more often than those of the second example.

Figure 5:
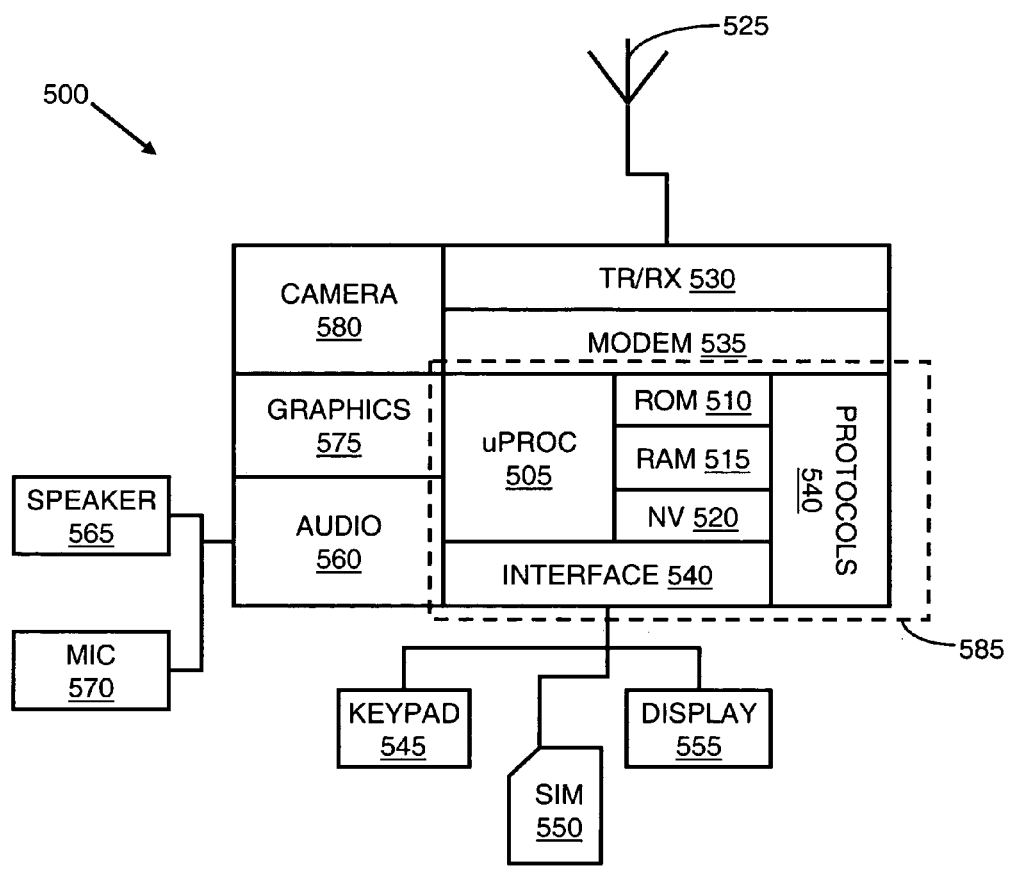
FIG. 5 is a block diagram showing the main functional components of a typical mobile station that may be configured to operate in accord with embodiments of the present invention.

The functional components of an exemplary mobile station 500 are illustrated in the block diagram in FIG. 5. The device in this example might be a mobile telephone handset. Embodiments of the present invention can be enacted by such a device. The device generally comprises an embedded processor 505, for controlling the overall operation of the device 500. The processor 505 has associated memory, including ROM 520, RAM 515 and non-volatile memory 520, for example for storing a control program of the device, application programs and/or an address book. Some or all of the memory might be separate from the processor. The device includes an antenna 525, which is connected to transmit/receive circuit 530, which communicates signals to and from the processor 505 via a modem 535. The device is arranged to interact with a base station according to several protocols, for example GSM, GPRS and/or 3G, which are supported by respective application programs, which are typically stored in a protocol module area 540 of non-volatile memory of the device. An interface module 540 facilitates communications with a keypad 545, a subscriber identity module (SIM) 550 and a display screen 555 of the device. An audio module 560 supports a speaker 565 and a microphone 570. A graphics processor 575 is included for processing graphics, for example for display on the display screen 555 and, in this example, the device includes a camera module 590.

A device of the kind shown in FIG. 5 is generally known in the prior art and it is typically an application program that needs to be arranged to control the device to operate in accord with embodiments of the present invention. For example, in embodiments of the present invention that operate in a GPRS cellular wireless communications system, a GPRS application program is arranged to operate generally in accord with the flow diagram of FIG. 4, at least insofar as a cell reselection operation is concerned. In any event, at least a subset of the main components of the device in FIG. 5, as shown within the dotted line 585, may be provided as a single chip device, or as plural chips or components, which can be installed in a mobile station to operate according to embodiments of the present invention.

It will be appreciated that cell reselection can be held off and then initiated in many different ways, all within the scope of aspects and embodiments of the present invention.

Having thus described the invention by reference to the embodiments shown in the drawings it is to be well understood that the embodiments in question are by way of example only and that modifications and variations such as will occur to those possessed of appropriate knowledge and skills may be made without departure from the spirit and scope of the invention as set forth in the appended claims and equivalents thereof.

The invention claimed is:

1. A cell reselection method for handing a mobile station from a serving cell to a selected target cell in a cellular wireless communications system, comprising plural cells, including the serving cell and plural other cells that are potential target cells, the method comprising:
   monitoring a first indicator, which is indicative of a signaling level of the serving cell;
   monitoring second indicators, each one being indicative of a signaling level of one of the plural potential target cells;
   initiating a timer associated with a potential target cell, when the respective second indicator indicates that the signaling level of the potential target cell is better than the signaling level of the serving cell, each timer having an associated expiry;
   if at least one timer is running when expiry of another initiated timer occurs, then, after delaying for an additional period after at least the first timer has expired, selecting from the potential target cells a target cell having a second indicator, which indicates that the signaling level of the respective target cell is better than the signaling level of the serving cell; and
   initiating a cell reselection of the mobile station to the selected target cell, wherein if other timers associated with potential target cells are running that do not have a signaling level that is better than the signaling level of the cell with the expired timer, then the cell with the expired timer is reselected, and wherein if two or more timers expire at the same time, the potential target cell having the best signaling level is reselected.

2. The method according to claim 1, wherein the selecting is delayed only while a second indicator indicates that the signaling level of a respective potential target cell, having an unexpired timer, is better than the signaling level of each potential target cell for which a timer has already expired.

3. The method according to claim 1, comprising selecting as the target cell, the potential target cell having a signaling level that is better than any other monitored potential target cell.

4. The method according to claim 1, comprising selecting as the target cell, if only one timer has been initiated and expired, the potential target cell that has the better second signaling indicator.

5. The method according to claim 1, wherein the additional period is while a timer is running and a second indicator indicates that the signaling level of a respective potential target cell, having an unexpired timer, is better than the signaling level of each potential target cell for which a timer has already expired.

6. The method according to claim 5, wherein a reselection is initiated if no second indicator, that is associated with a running timer, is better than every indicator, which is associated with an expired timer, even if there is an unexpired timer still running.

7. The method according to claim 1, wherein the additional period is when at least the two timers expire.

8. The method according to claim 1, wherein the additional period is when all the timers expire.

9. The method according to claim 1, wherein the cellular communications network supports packet switched communications.

10. The method according to claim 1, wherein the cellular communications network supports GPRS communications.

11. The method according to claim 1, wherein the signaling indicator is associated with signal power.

12. The method according to claim 1, wherein the signaling indicator is a C2 parameter.

13. The method according to claim 1, wherein the cellular communications network supports circuit switched communications.

14. The method according to claim 1, wherein the cellular communications network supports GSM communications.

15. The method according to claim 1, wherein the mobile station initiates cell reselection.

16. The method according to claim 1, wherein the cellular wireless communications system initiates cell reselection.

17. A cellular wireless communications system comprising plural cells, including a serving cell and plural potential target cells, and a mobile station operable with the cellular wireless communications system, the system comprising:
   a first process, arranged to monitor a first indicator, indicative of a signaling level of the serving cell;
   a second process, arranged to monitor second indicators, each one being indicative of a signaling level of one of the plural potential target cells;
   a third process, arranged to compare the first indicator with the second indicators and initiate a timer associated with a potential target cell whenever the respective second indicator of the potential target cell is better than the first indicator, each timer having an associated expiry;

and a fourth process, arranged to select from the potential target cells, if at least one timer is running when the expiry of another initiated timer occurs and after delaying for an additional period after at least the first timer has expired, a target cell having a second signaling indicator, which indicates that the signaling level of the respective target cell is better than the signaling level of the serving cell, and initiate cell reselection to the selected target cell wherein if other timers associated with potential target cells are running that do not have a signaling level that is better than the signaling level of the cell with the expired timer, then the cell with the expired timer is reselected, and wherein if two or more timers expire at the same time, the potential target cell having the best signaling level is reselected.

18. A mobile station adapted for operation in a cellular wireless communications system, the device comprising:

a receiver arranged to receive signals and derive indicators therefrom, each indicator being indicative of the signaling level of a cell of the system; and a processor arranged to operate a cell reselection operation, the operation comprising:

a first process, arranged to monitor a first indicator, indicative of a signaling level of the serving cell;

a second process, arranged to monitor second indicators, each one being indicative of a signaling level of one of the plural potential target cells;

a third process, arranged to compare the first indicator with the second indicators and initiate a timer associated with a potential target cell whenever the respective second indicator of the potential target cell is better than the first indicator, each timer having an associated expiry;

and a fourth process, arranged to select from the potential target ceils, if at least one timer is running when the expiry of another initiated timer occurs and after delaying for an additional period after at least the first timer has expired, a target cell having a second signaling indicator, which indicates that the signaling level of the respective target cell is better than the signaling level of the serving cell, and initiate cell reselection to the selected target cell, wherein if other timers associated with potential target cells are running that do not have a signaling level that is better than the signaling level of the cell with the expired timer, then the cell with the expired timer is reselected, and wherein if two or more timers expire at the same time, the potential target cell having the best signaling level is reselected.

19. A programmed processing arrangement arranged to operate in accord with the method of claim 1.

20. A mobile communications apparatus arranged to operate in accord with the method of claim 1.

21. A cell reselection apparatus for handing a mobile station from a serving cell to a selected target cell in a cellular wireless communications system, comprising plural cells, including the serving cell and plural other cells that are potential target cells, the apparatus comprising:

means for monitoring a first indicator, which is indicative of a signaling level of the serving cell;

means for monitoring second indicators, each one being indicative of a signaling level of one of the plural potential target cells;

means for initiating a timer associated with a potential target cell, when the respective second indicator indicates that the signaling level of the potential target cell is better than the signaling level of the serving cell, each timer having an associated expiry;

means for delaying for an additional period after at least the first timer has expired if at least one timer is running when expiry of another initiated timer occurs;

means for selecting from the potential target cells a target cell having a second indicator, which indicates that the signaling level of the respective target cell is better than the signaling level of the serving cell, wherein the means for selecting is operable after the means for delaying if at least one timer is running when expiry of another initiated timer occurs; and means for initiating a cell reselection of the mobile station to the selected target cell, wherein if other timers associated with potential target cells are running that do not have a signaling level that is better than the signaling level of the cell with the expired timer, then the cell with the expired timer is reselected, and wherein if two or more timers expire at the same time, the potential target cell having the best signaling level is reselected.

* * * * *